(12) United States Patent
Lowitz

(10) Patent No.: US 10,184,861 B2
(45) Date of Patent: Jan. 22, 2019

(54) STRUCTURAL ELEMENT CRACK MONITORING DEVICE AND METHOD

(71) Applicant: Gregory E. Lowitz, Redwood City, CA (US)

(72) Inventor: Gregory E. Lowitz, Redwood City, CA (US)

( * ) Notice: Subject to any disclaimer, the term of this patent is extended or adjusted under 35 U.S.C. 154(b) by 269 days.

(21) Appl. No.: 14/961,300

(22) Filed: Dec. 7, 2015

(65) Prior Publication Data

US 2016/0161383 A1 Jun. 9, 2016

Related U.S. Application Data

(60) Provisional application No. 62/088,966, filed on Dec. 8, 2014.

(51) Int. Cl.
| | |
|---|---|
| *G01M 5/00* | (2006.01) |
| *G01M 99/00* | (2011.01) |
| *G01B 5/30* | (2006.01) |

(52) U.S. Cl.
CPC .............. *G01M 99/00* (2013.01); *G01B 5/30* (2013.01)

(58) Field of Classification Search
CPC ......... G01M 99/00; G01B 5/30; G01B 11/20; G01N 2203/0066; G01N 3/08; G01L 5/0033
See application file for complete search history.

(56) References Cited

U.S. PATENT DOCUMENTS

| | | | | |
|---|---|---|---|---|
| 4,472,883 A | * | 9/1984 | Ortega | G01B 5/30 33/1 H |
| 5,509,374 A | * | 4/1996 | Trout | G01B 5/30 116/200 |

(Continued)

FOREIGN PATENT DOCUMENTS

| | | | | |
|---|---|---|---|---|
| GB | 2246863 A | | 2/1992 | |
| GB | 2251311 A | | 7/1992 | |
| GB | GP 2251311 | * | 7/1992 | ............... G01B 5/30 |

(Continued)

OTHER PUBLICATIONS

"Introducing Buildera Crackmon®", Buildera, CA, 3 pages, date unknown; http://www.buildera.com/crackmon-crack-monitors/.

(Continued)

*Primary Examiner* — Harshad R Patel
*Assistant Examiner* — Nigel Plumb
(74) *Attorney, Agent, or Firm* — Price Heneveld LLP

(57) ABSTRACT

A system for monitoring a crack in a structural member includes a first fixable component having a first plate defining a top surface and a bottom surface. The first plate is at least partially transparent in at least a first area thereof, and the first fixable component further includes a mounting surface disposed away from the bottom surface of the plate. The system also includes a second fixable component having a second plate defining a top surface and a bottom surface defining a mounting area thereon. A distance between the mounting surface and the bottom surface of the first plate is greater than a thickness of the second plate defined between the top and bottom surfaces thereof. A measurement array and a pair of orthogonal crosshairs are disposed on respective ones of the first plate within the at least partially transparent area and the second plate.

19 Claims, 9 Drawing Sheets

(56) References Cited

U.S. PATENT DOCUMENTS

| | | | | |
|---|---|---|---|---|
| 6,109,115 A | * | 8/2000 | Miyazaki | G01G 19/02 |
| | | | | 73/794 |
| 7,021,154 B2 | * | 4/2006 | Hashimoto | G01L 23/08 |
| | | | | 73/777 |

FOREIGN PATENT DOCUMENTS

| | | |
|---|---|---|
| JP | 2005283196 | 10/2005 |
| JP | 2008014749 A | 1/2008 |

OTHER PUBLICATIONS

"3D Crack Meter", Geosense, UK, 1 page, date unknown; http://www.geosense.co.uk/products/details/3d-crack-meter.

Sudhir Kumar Tewatia, A.K. Dhawan, K. Venkatachalam, and Pratima Rani Bose, "An Alternative to a 3D Crack Monitor-4-Pin Algorithm", Journal of Testing and Evaluation, vol. 34 No. 5, Sep. 2006, 3 pages.

Sudhir Kumar Tewatia and K Venkatachalam, "Safety Concerns in Geotechnical Engineering—3D Crack Monitoring", EJGE, 2002, 6 pages, http://www.ejge.com/2002/Ppr0224/Ppr0224.htm.

International Search Report and Written Opinion of the International Searching Authority, or the Declaration dated Apr. 1, 2016 for International Application No. PCT/US2015/64292 filed on Dec. 7, 2015; 12 pages.

\* cited by examiner

STRUCTURAL ELEMENT CRACK MONITORING DEVICE AND METHOD

CROSS REFERENCE TO RELATED APPLICATION

This application claims priority under 35 U.S.C. § 119(e) to U.S. Provisional Patent Application No. 62/088,966, filed on Dec. 8, 2014, entitled "CRACK MONITOR AND METHOD OF MANUFACTURING, INSTALLATION, AND DATA COLLECTION," which is incorporated herein by reference in its entirety.

FIELD OF THE INVENTION

The present invention relates generally to structural crack monitoring, and more particularly, to crack monitoring in two or three dimensions with variable Z-axis compensation, as well as related methods of manufacturing, installation, and data collection.

BACKGROUND OF THE INVENTION

Devices to measure cracks are generally for use by civil, geotechnical, and structural engineers in forensic monitoring of structures for differential changes in crack displacement due to foundation settlement, soil heaving, subsidence, subsurface soil compaction, temperature, moisture, and other geotechnical or construction-related factors. Furthermore, establishing crack profiles before and after geophysical events such as earthquakes and hurricanes is beneficial in assessing impact to structural integrity, which affects occupant safety and choice of remediation.

Structural cracks, regardless of cause, may appear in concrete, masonry, stone, steel welds, wood joints, or virtually any material subjected to tensile, compressive, or shear stresses and loads. Engineered separation joints, such as expansion joints, are intentional and allow adjacent surfaces to expand and contract, minimizing cracking elsewhere. Cracks and expansion joints in reinforced concrete, for example, can lead to moisture permeation and premature corrosion of reinforcing steel (rebar), dowels, and fasteners, thus reducing service life or load-bearing capacity of the structure. Depending on the structure, its intended use, and the contractual warranty between the contractor and building owner, cracks larger than a specified width may require intervention, such as grooming and epoxy injection. For example, tolerable crack widths in reinforced concrete are well documented in the American Concrete Institute publication ACI 224R-01 "Control of Cracking in Concrete Structures," (2001; ISBN: 9780870310560).

Various devices have been developed and commercially deployed to measure crack displacement in structures, such as building foundations, bridges, dams, highways, pipelines, ships, and other high-value assets. Examples include but are not limited to rulers, caliper crack marks, thermoplastic 2D crack monitors, embedded crack sensors, and more complex electronic strain-gauge sensors with wireless connectivity. Each method offers varied benefits and tradeoffs of lifecycle cost, accuracy, weather-resistance, installation complexity, vandal resistance, measurement flexibility, and engineering traceability.

However, prior-art mechanical two-dimensional crack monitors fail to measure or account for the effects of Z-axis offsets across or perpendicular to the crack plane, either at the time of installation or throughout the crack-measurement study. Rather, they assume that adjacent surfaces are coplanar and that top and bottom plates will remain essentially flush and parallel to each other throughout the measurement service life. Although some prior instruments may account for minor Z-axis fluctuation, they do not measure or record Z-axis motion. Other devices that have been developed to measure Z-axis motion have a limited range of measurement and may rely on difficult-to-achieve and maintain manufacturing tolerances.

Mounting a crack monitor across a span that also moves along the Z-axis (perpendicular to the crack plane), however, may readily deform the measuring device, including up to complete breakage. Z-axis movement perpendicular to the crack plane is common in unreinforced masonry, or impaired reinforced concrete. Sudden seismic events or sinkholes can also impart near-instantaneous shifts in crack planes, which quickly damage instrumentation. Crack monitors are typically injection-molded from common thermoplastic such as acrylic or polycarbonate. These molded products contain a fixed, integral step, which exactly matches the plate thickness. For example, if the plate thickness is 3 mm, the fixed mounting offset is also 3 mm, such that when mated together and mounted on a coplanar surface, the top and bottom plates may slide freely and independently. However, these devices are subject to deflection or cracking when one side of the crack plane experiences a step-wise shift along the Z-axis, such that a portion of the bottom, cantilevered plate bends upward across the crack plane. Depending on the direction of Z-axis shift, the bottom plate may press up against the top overlapping plate, distorting both in an upward trajectory. Conversely, the top plate may begin to press down on the bottom plate, distorting both in a downward trajectory. Regardless of shift direction, such bending distortion often results in the measuring device resting cockeyed against the crack plane, making it difficult to obtain accurate readings due to parallax and optical shifting between the two plates. In this situation, the adhesive or fasteners used to fixedly secure the device may fail, or the device may deform to ultimate breakage. Once this occurs, all measurements of relative crack movement are permanently lost along all dimensions, and the measurement process must start anew using a replacement device.

Existing devices are often injection molded with a fixed, integrated mounting flange, and are designed to operate under the ideal assumption that the crack plane is coplanar along the Z-axis. While injection molding offers the benefit of low part cost in high volume, the higher initial capital cost of tooling precludes rapid evolution and customization of the crack measurement device to meet varying customer requirements. For example, measurement of expansion joints of bridges may require measurements spanning 5 to 10 inches or more, far greater than the typical span of economy injection-molded crack monitors. The investment in tooling for each situation becomes cost-prohibitive in all but the highest volume applications, thus limiting flexibility to adapt the measurement device to meet new or evolving customer requirements.

Furthermore, it is desirable and convenient to concurrently measure independent X, Y and Z vectors, as well as absolute magnitude, defined as the square root of (X-squared+Y-squared) in the case of a 2D measurement, or the square root of (X-squared+Y-squared+Z-squared) in the case of a 3D measurement, with or without a calipers.

In addition, many existing crack monitors print and establish the zero-offset reference point in the middle of an X-Y Cartesian grid that typically spans+/−20 mm×+/−10 mm to +/−25 mm×+/−10 mm or thereabout. In some situations, this choice unnecessarily limits the X-axis measurement range of the crack monitor by as much as a factor of two. For example, if the initial crack width is small—such as a few millimeters, which is typical of reinforced concrete in early stages of cracking—then it is unlikely that the crack width could close in a far negative direction due to the compressive strength of concrete. However, concrete is weak in tension and it is much more probable that the crack width will widen over time.

Moreover, current methods of data collection are manually intensive, and require transcribing and recording measurements into engineering notebooks, and subsequent transfer to a computer for client reports. Current methods lack consistent mechanisms for engineering traceability, which adds further uncertainty to collected data. As many forensic studies are conducted for scientific evidence in litigation relating to failing foundations and structures, engineering traceability is a key component of a complete and accurate case.

SUMMARY OF THE INVENTION

According to one aspect of the present disclosure a system for monitoring a crack in a structural member includes a first fixable component having a first plate defining a top surface and a bottom surface. The first plate is at least partially transparent in at least a first area thereof. The first fixable component further includes a mounting surface disposed away from the bottom surface of the plate. The system also includes a second fixable component having a second plate defining a top surface and a bottom surface defining a mounting area thereon. A distance between the mounting surface and the bottom surface of the first plate is greater than a thickness of the second plate defined between the top and bottom surfaces thereof. A measurement array is disposed on one of the first plate within the at least partially transparent area and the second plate. The measurement array includes a Cartesian grid defining a center and a plurality of concentric circles emanating from the center. A pair of orthogonal crosshairs is disposed on the other of the first plate within the at least partially transparent area and the second plate.

According to another aspect of the present disclosure a method for fabricating a crack monitoring system includes bonding UV-curable inks to a thermoplastic or metallic substrate panel using a flatbed digital printer. The UV-curable inks are bonded in a pattern associated with a plurality of components of a plurality of crack monitor assemblies with each assembly including at least a lower plate, an upper plate, and at least one spacer. The method also includes separating the substrate panel into the plurality of components of a plurality of crack monitor assemblies by one of routing, milling or laser cutting using a flatbed cutter.

According to another aspect of the present disclosure a method for monitoring a crack in a first structural member includes affixing a drilling guide including a plurality of guide holes in a first mounting pattern over a crack in the structural member. The drilling guide includes a printed substrate with a compressible membrane adhered thereto. A layer of adhesive is applied over a surface of the compressible membrane opposite the substrate. The drilling guide is adhered to the structural member by compression of the compressible layer against a surface of the structural member with the adhesive layer in contact therewith. The method also includes drilling a plurality of mounting holes into the structural member using the guide holes according to the first mounting pattern. The method further includes mounting a first fixable component to the structural member on a first side of the crack using a first plurality of fixation elements within a first portion of the first mounting pattern, a first plate of the first fixable component extending over the crack and mounting a second fixable component to the structural member on a second side of the crack using a second plurality of fixation elements within a second portion of the first mounting pattern with a second plate of the second fixable component extending over the crack and overlapping the first plate. Relative movement between the first plate and the second plate is then observed over time.

In general, the present disclosure is directed to a system and methods for improving the field of structural crack monitoring in two or three dimensions, and may solve many of the aforementioned shortcomings through improvements in the design, imprinted graphics, manufacturing process, installation method, and data collection. The disclosed system and method offer forensic engineers and surveyors a wide range of measurement options and improved traceability, optimally suited to the environment. By focusing on cost-effective digital manufacturing techniques and end-user flexibility, the present system can provide new crack monitoring features. More particularly, the improved crack monitor includes one or more spacers of varying thicknesses designed to compensate for Z-axis offsets perpendicular to the crack plane. The crack monitor also includes provisions for measuring Z-axis changes using a calipers extension arm. The crack monitor also includes an improved visual measurement grid, including not only traditional Cartesian coordinates, but also polar magnitude on the same scale. The crack monitor also includes improved fastening options and positions, embedded traceability features, including unique ID's, and enhanced field learning and data collection using a mobile device via imprinted quick-launch QR code and/or NFC pointing to online installation instructions and video tutorial. A controlled digital manufacturing process may offer a wider range of sizes and features with no tooling costs.

In one aspect, the crack monitor may further comprise a plurality of two horizontal and two vertical fastener slots symmetrically positioned on each of the left side of the lower plate, the right side of upper plate, and centrally on the spacer plate, arranged in a specific relative orientation and optimized for different fastener types and sizes. The top and bottom horizontal slots may measure approximately 0.60" long by 0.20" wide (optimized for #8/M4 fasteners) and the vertical slots may measure approximately 0.20" long by 0.16" wide (optimized for #6/M3.5 fasteners). The first horizontal slot may be vertically centered 0.30" above the horizontal midline of each the lower plate, upper plate, and spacer plate, and the second horizontal slot may be vertically centered 0.30" below the horizontal midline of the lower plate, upper plate, and spacer plate. In this manner, the vertical separation between the horizontal centerlines of the horizontal slots may be 0.60" with the first vertical slot centered horizontally 0.25" to the left of the vertical centerline of the horizontal slots and the second vertical slot centered horizontally 0.25" to the right of the centerline of the horizontal slots. The two vertical slots can be centered midway between the horizontal centerlines of each horizontal slot such that the horizontal separation between the vertical centerlines of the vertical slots is 0.5".

The crack monitor may further include a circular hole in each of the lower plate, the upper plate and the spacer plate, such a circular hole having a diameter between 0.05" to 0.20", for example, or in a further embodiment 0.1". The hole may be concentrically positioned at the virtual intersection of the vertical midline of the two horizontal slots and the horizontal midline of the two vertical slots. Such a hole may be used in conjunction with digital centerline calipers to measure crack-width magnitude changes with a high degree of precision.

Further, the crack monitor may include four slotted holes, each measuring approximately 0.156" (4 mm) long by 0.078" (2 mm) wide and disposed on upper plate. The slotted holes may be positioned symmetrically inside and adjacent to the opposing corners of the perimeter bounding box of the crosshairs. In this manner, the slots can be used in conjunction with a telescoping depth gauge, or extension arm, included in certain measurement calipers to measure z-axis offset in up to four locations.

In an example, the measurement grid may include both X-Y Cartesian coordinates and axes, as well as contrasting concentric circles emanating from the 0-0 reference point to measure polar magnitude. The concentric circles may be in a color contrasting to the measurement grid, which may be, in an example, a deep red color, consisting of 15C/90Y/100M/10K. The measurement grid may further optionally include isolated tick dots or tick points at equal X-Y spacing across the measurement grid. Such tick points may be positioned at equidistant intervals, such as 1 mm×1 mm and may be black or any contrasting color so as to differentiate them from other parts of the scale.

In one embodiment, the measurement grid may be printed on a user-interchangeable window recessed flush with the top surface of the lower plate and fastened into the lower plate. The window may be swapped for different measurement grids prior to or after installation, such as to provide English or metric units, concentric circles, polar coordinates, sloped lines measuring angular displacement and the like.

In a further aspect, the lower baseplate and/or upper plate may include a pre-printed variable-data QR code, unique device ID, and/or pre-programmed embedded NFC chip. Such a QR code or NFC chip may be scanned with a mobile smartphone or wireless tablet to store and retrieve relevant information from a remote website or cloud service, including installation documentation, video tutorials, technical specifications, and re-ordering information. In such an arrangement, once a connection to the service is established, the user may enter and archive other pertinent information, including geo-location coordinates, crack measurement data, temperature, soil moisture content, relative humidity, crack location ID, jobsite photographs, and other engineering notes relevant to the measurement and forensic analysis.

In various examples of the method described above, the substrate may be of thermoplastic that is sheet-extruded UV-stabilized acrylic, acrylonitrile butadiene styrene (ABS), polycarbonate, or glycol-modified polyethylene (PETG) with high dimensional stability. The thermoplastic may be between 2 mm and 6 mm thick, and in an embodiment between 4 mm and 5 mm thick. The thermoplastic may be processed in panels ranging in size from 12" wide by 18" long to up to 48" wide by 96" long. Larger panels are contemplated and may be up to 102" wide, which may be a common limit of readily-available extruding machines. The substrate may be of thermoplastic, which may further include a proprietary copolymer to improve ink adhesion to the substrate. In one aspect, a low coefficient of expansion metal may be substituted for the thermoplastic. Such metals may include (in order of increasing cost and thermal stability) aluminum, stainless steel, and titanium, for example.

In one aspect, the panel may be allowed to acclimate to an ambient temperature, such as between 20-25° C. and 45-55% relative humidity. Such readings may be logged with a suitable handheld IR thermometer and ambient humidity meter. Further, the thermoplastic panels may be measured and treated for static electricity prior to printing with the use of an air ionizer to neutralize electrical discharge during printing. The step of bonding using UV-curable inks may be carried out by printing using a flatbed digital printer with UV-cured inks. In an example, the printer may be configured for at least 500 DPI resolution, and in a further example, about 1000 DPI or greater. In one aspect, the printer may be configured for unidirectional printing to avoid bidirectional alignment issues. The pattern in which the inks are bonded may include printed text and graphics and may use multiple process colors, including white, cyan, magenta, yellow, and black to achieve deeply saturated colors and contrast with UV fade resistance.

In one aspect, the printed pattern may be allowed to cure for at least 15 minutes prior to carrying out the separating step. Further, the individual components of the system may be separated by being routed, milled, or laser cut at approximately the same temperature and humidity at which the substrate was printed in order to achieve a desired degree of precision across the panel.

In various examples of the method for monitoring, set forth above, the said drilling guide may be made from rigid or semi-rigid expanded PVC, such as SINTRA® (A3 Composites) or foam-core board, and may be at least 2 mm to 3 mm thick. The drilling guide may further include a peel-off shock-absorbing foam backing that may be between 0.5 mm and 3 mm thick, and in a further example between 1 mm and 2 mm. An aggressive rubber or acrylic adhesive may be applied on the foam backing such that the drilling guide remains secure during, for example, hammer-drilling operations, and, further, such that the drilling guide can be cleanly removed after mounting holes are drilled.

In a further aspect, four ³⁄₁₆" (5 mm) mounting holes may be drilled at least 1½" deep into the target mounting surface, the holes being, subsequently, cleaned of all dust and debris. Toggler®-brand Alligator® A5 polypropylene anchors, compatible with a wide range of fastener sizes, including #6(M3.5), #8(M4.0) or #10(M5.0), may be used in connection with the mounting holes to fasten each fixable component of the crack monitor to the structural member. Further, four stainless-steel sheet metal security fasteners typically #6/M35 or #8/M4 Torx® or TorxPlus® approximately 1½" in length can be inserted through the slots and into the mounting holes and hand-tightened with stainless-steel lock washers and stainless-steel load-distributing plates to secure the crack monitor against vandalism and inadvertent movement, while simultaneously reducing the likelihood of cracking the thermoplastic substrate. The Torx® or Torx Plus® security screws can be optionally substituted with Key-Rex® or Penta Plus® security fasteners from Bryce Fastener, offering a secure screw head with a proprietary custom key, other such fasteners being similarly useable. The security fasteners may be combined with structural thixotropic epoxy, such as Buildera StruPoxy™, Aboweld™ 8101-5, or similar adhesive for further fixation.

These and other objects, features, and benefits of the invention will be more readily understood and appreciated by those skilled in the art, by reference to the written specification and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

DETAILED DESCRIPTION

Figure 1:
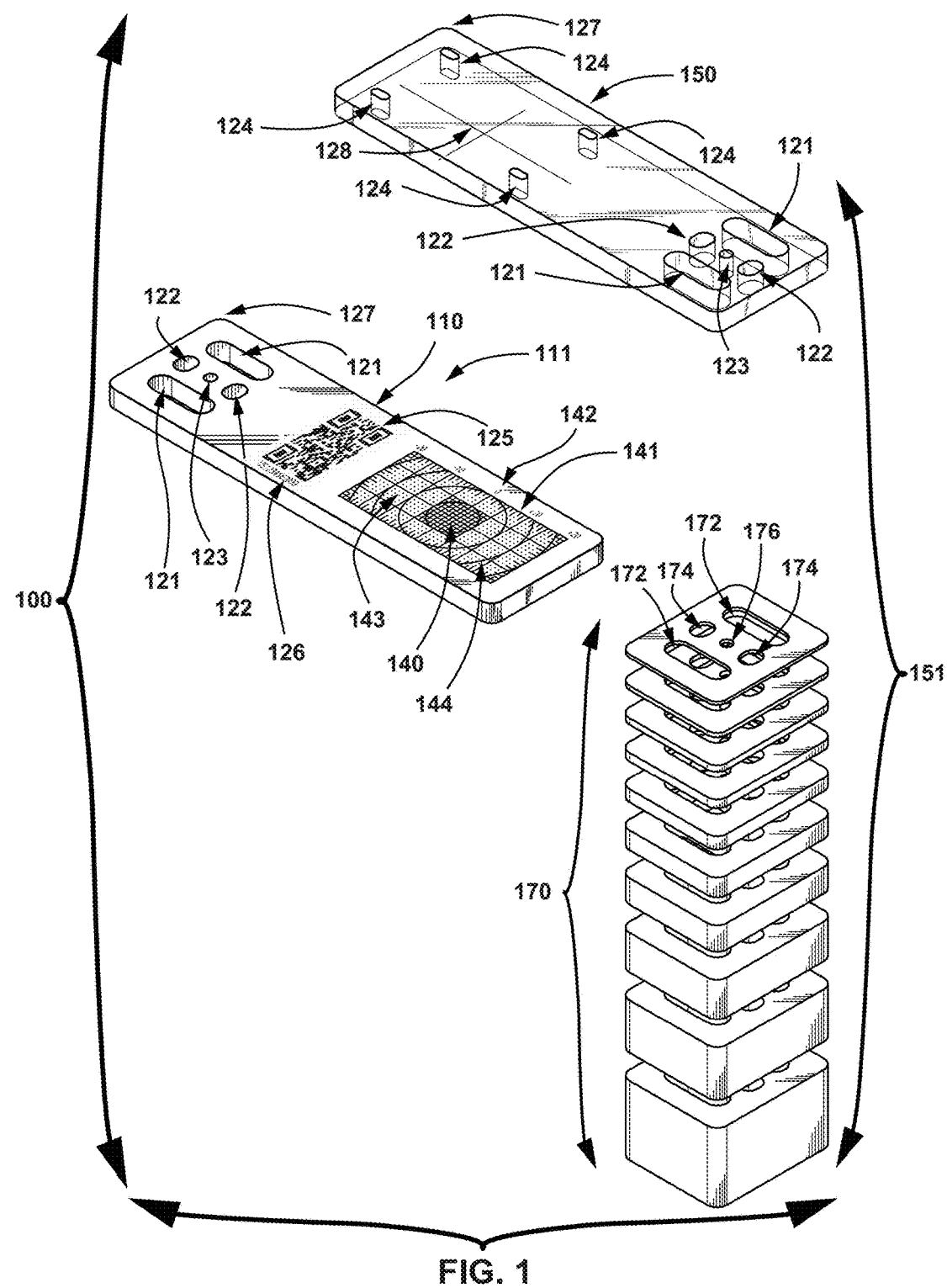
FIG. 1 is bottom-front perspective view of a crack monitor.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

A crack monitor with variable Z-axis compensation is illustrated in the drawings and generally designated 100. In the embodiment, illustrated in FIG. 1, two flat overlapping plates 110 (bottom plate) and 150 (top plate) are used, each with a length-to-width (X:Y) aspect ratio between 1:1 and 10:1, and in an embodiment between 2:1 and 4:1, and in a further embodiment between 2.5:1 and 3.5:1. Individual plate thickness across each plate 110 and 150 may be between 3 mm and 6 mm, and in an embodiment 4 mm to 6 mm thick, and in another embodiment 4.5 mm to 6.0 mm thick. Surface thickness variation may remain within 10%, and more specifically 5% of nominal thickness.

Depending on the intended operating environment, including factors such as expected temperature range, vandalism resistance, outdoor condition exposure, and chemical reactivity, plates 110 and 150 are CNC-routed from larger panels 700 of optically-clear extruded UV-stabilized acrylic, polycarbonate, or glycol-modified polyethylene (PETG). Compared to injection molding, benefits of this approach include the reduction or elimination of up-front tooling costs and potentially infinite flexibility in defining the shape, size, and material selection, allowing rapid customization to market requirements. The shape may vary for functional or aesthetic reasons.

Initial visible light transmissivity of top plate 150 may, in an embodiment, be between about 83% and about 95%, and in a further embodiment between about 87% and about 92%. Although performance thermoplastics may be preferred for their low cost, good chemical resistance, and proven long-term endurance, more robust materials such as anodized aluminum, stainless steel, or titanium could be substituted and fabricated using a generally similar manufacturing process, and such materials are comprehended within the scope of this disclosure. Compared to thermoplastics, the metals described herein and otherwise known may offer improved thermal stability and measurement precision due to their lower thermal coefficients of expansion. For example, Titanium has a thermal coefficient of linear expansion that is nearly ten times smaller than typical thermoplastics.

The leftmost side of bottom plate 110 and the rightmost side of top plate 150 include a flexible hole arrangement that accommodates multiple fastener sizes, which may range from #6 (M3.5) to #10 (M5) and, in a particular embodiment, #6 (M3.5) to #8 (M4) pan-head, button-head, or socket-head stainless-steel sheet-metal security screws, fastened to the target substrate with lock washers and anchors, such as Toggler®-brand Alligator® A5 polypropylene anchors, available from Mechanical Plastics Corporation. Alternatively, the hole arrangement may act as an integral adhesive cavity when installed with thixotropic (non-sagging) structural epoxy, such that excess epoxy between the crack monitor and substrate fills the holes in X, Y, and Z dimensions, providing improved locking strength. In one example, epoxy and fasteners may be used in combination to secure the two plates and Z-axis compensating spacers to a target substrate of interest.

In an embodiment, the top and bottom horizontal slots 121 may measure 0.6" long by 0.2" wide and may be optimized for #8 (M4) fasteners, allowing ample adjustment range to compensate for drilling errors or the like. The vertical slots 122 may measure 0.156"×0.2", and may be optimized for #6 (M3.5) fasteners. Similar hole arrangements are contemplated and may scale to accommodate larger fasteners in proportion to the size of the crack monitor. A central hole 123 measuring 0.100" in diameter may be used by a centerline caliper, such as a Mitutoyo™ Series 573, to precisely measure crack-width magnitude when positioned between the opposing holes 123 of top and bottom plates 150 and 110, respectively. Four oblong holes 124 in the top plate 150 measuring approximately 0.078"×0.156" are used to measure z-axis offset between plates using the telescoping extension arm on the end of most digital calipers. The choice of the four locations is such to minimize potential interference with the crosshairs and to provide at least one or more measurement points over the traversed range of the two plates, regardless of X or Y shift. Other hole arrangements are possible and are within the scope of this disclosure.

Figure 4:
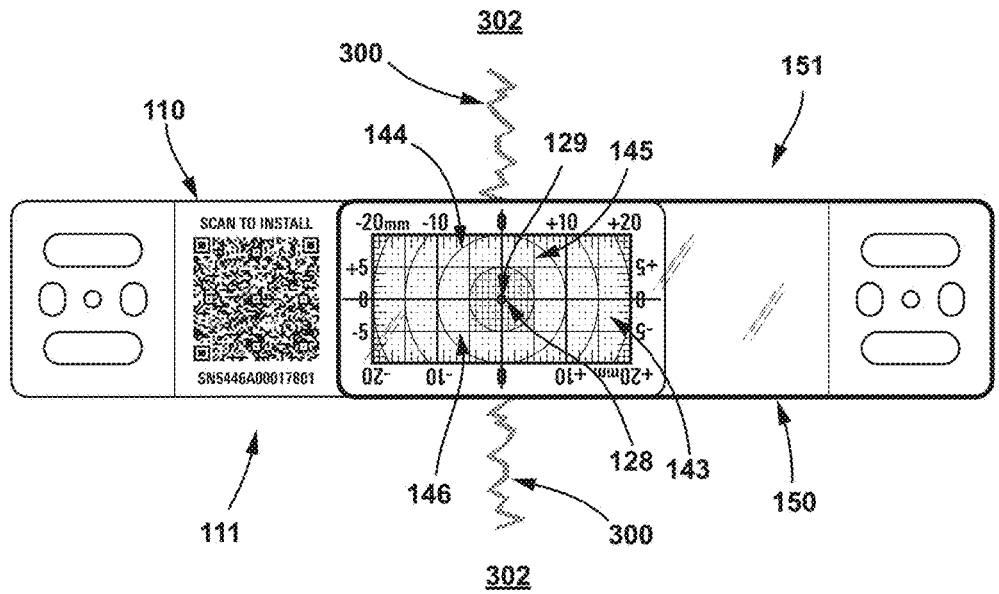
FIG. 4 is a front elevation view of the crack monitor of FIG. 1 installed on the structural member in an initial position.

The illustrated measurement array 140 consists of a grid including Cartesian X-Y axes, perimeter tick marks 141, numeric scale 142 in millimeters or inches, and equally-spaced visual tick points 143 across the measurement grid 140. As shown in FIG. 4, the grid also includes a plurality of vertical gridlines 145 and horizontal gridlines 146 (the X- and Y-axes corresponding to the gridlines at a zero-zero position (i.e. the origin). The vertical gridlines 145 and horizontal gridlines 146 can be present at predetermined multiples of the tick mark 141 or tick point 143 spacing, for example every five tick points 143 or 5 mm or every ten tick points 143 or 10 mm. In a further example, vertical and horizontal gridlines 145,146 may be present in a first color (e.g. blue) at odd multiples of five tick points 143 (e.g. 5, 15, 25) and in black at multiples of ten tick points 143 (e.g. 10, 20, 30). Array 140 also includes a plurality of concentric circles or arc segments 144 (the arc segments resulting from truncation of the concentric circles due to the boundary of the grid, with such arc segments being optionally considered further concentric circles) to measure polar magnitude, defined as the square root of $(X^2+Y^2)$ relative to the 0-0 center point of the grid 140. The measurement grid 140 and surrounding graphics 125 and unique ID 126 can be imprinted on top of an opaque-white UV-cured ink base layer of between 1 to 3 ink layers, and in an embodiment 2 layers approximately 0.1 mm total thickness. For improved contrast, readability, and outdoor durability, the measurement grid 140 may be printed in a UV-cured rich black composite ink containing a high proportion of at least four process colors, namely C (cyan), M (magenta), Y (yellow), and K (black), and more preferably, in approximate proportions of 50C/50M/50Y/100K, respectively. This process provides exceptional contrast compared to traditional pad-printed or screen-printed inks, improving legibility in low light or inclement weather. When plate 150 is flipped over during installation, the cross hairs 128 may be on the bottom surface of plate 150, which may further improve resistance to UV-fading, and may further eliminate or reduce parallax associated with the plate thickness during measurements. In one embodiment, the zero-reference point along the X-axis may be adjusted to allow a relatively smaller range in the negative direction (crack closing), and relatively longer measurement range in the positive direction (crack opening). This may extend the X-axis measurement range of the device by up to factor of two without changing its size or manufacturing cost.

To improve resistance to non-planar Z-axis shifts and adapt to real-world field conditions, the crack monitor 100 may be used in a system that further includes a series of stackable spacers 170 to accommodate initial and future z-axis offsets. The spacers may be flat or interlocking, and may be installed under either or both plates 110 and 150. As shown in FIG. 1, a set of spacers 170 may be included with the system such that one or more spacers of selected ones of the various thicknesses can be assembled with at least upper plate 150 as well as lower plate 110, if desired. Accordingly, a lowermost spacer is positioned in contact with the structural member to-be monitored with upper plate 150 spaced away from the structural member by a sufficient distance (dictated by the conditions/topography of the structural member) so as to overlie lower plate 110 with sufficient clearance for Z-axis movement of upper plate 150 or lower plate 110 toward each other due to shifting of the structural member in the area of the monitored crack 300 (FIG. 4), as shown, for example, in FIG. 3. As further illustrated in FIG. 1, spacers 170 can each include an array of holes including long holes 172, short holes 174 and caliper holes 176 that generally align with the similar holes 121, 122, and 123 included in upper plate 150 and lower plate 110 so that spacers 170 can accommodate any screws used to affix the resulting respective fixable components 111 and 151 (each representing one of upper plate 150 or lower plate 110 alone or in combination with one or more spacers 170) to structural member 302.

Figure 2:
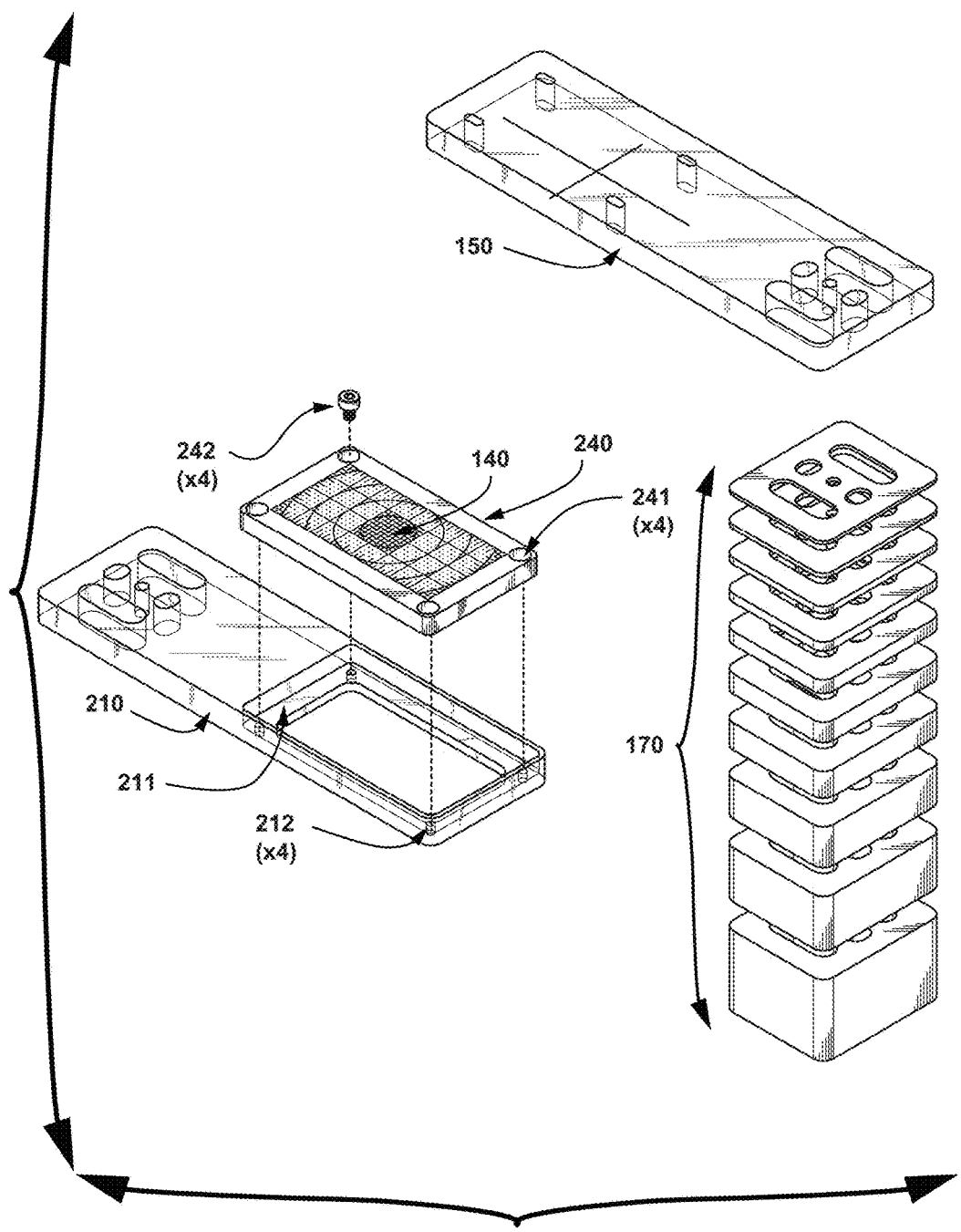
FIG. 2 is a bottom-front perspective view of an alternative crack monitor, showing an interchangeable measurement grid secured with fasteners.

FIG. 2 illustrates a second embodiment of a crack monitor with Z-axis compensation including a modular bottom plate 210. For clarity, only the differences are discussed herein, other aspects of the crack monitor of FIG. 2 being similar to that which is discussed above with respect to FIG. 1. A recessed shelf 211 approximately 25%-75% of the thickness of bottom plate 210, which may, in a further embodiment, be 60%-70% of the thickness, accommodates a removable insert 240 having measurement array 140 printed thereon, the thickness thereof matching the depth of the recessed shelf 211 to within a tolerance of +/−5%, and in a further embodiment within +/−2%. The removable insert 240 securely mounts via four threaded fasteners and washers 242 that rest inside each of four counter-bored holes 241, and are tightly secured into each of four threaded holes 212 of bottom plate 210.

Prior to installation, the consumer may swap the removable measurement grid 240 for a different measurement grid based on the measurement requirements. Measurement grids may include different scales (such as inches or millimeters), as well as grids to measure angular displacement, slope, polar magnitude, or any number of other permutations.

Although bottom plate 210 is shown as a transparent thermoplastic, it may also be fabricated from metal, such as anodized aluminum, stainless steel, or titanium.

Figure 3:
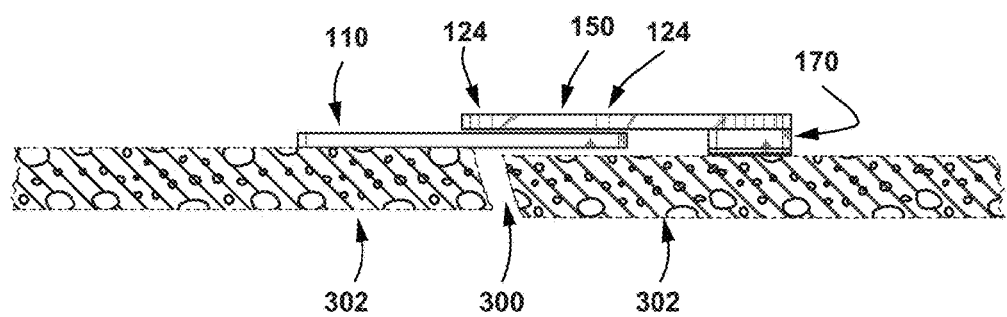
FIG. 3 is a bottom elevation view of the crack monitor of FIG. 1 installed on a structural member, showing variable Z-axis spacer compensation across a non-planar substrate.

FIG. 3 illustrates a bottom plan view of the embodiment of FIG. 1 or FIG. 2 mounted on a structural member 302 in the form of a concrete substrate spanning a crack 300 with a Z-axis shift. Each of the top 150 and bottom plates 110 may be fixedly secured on opposite sides of the crack 300 using fasteners and/or epoxy adhesive. The initial X-Y offset and polar magnitude are noted and recorded. As the respective portions of structural member 302 on opposing sides of crack 300 move, changes in linear and radial magnitude are measured by viewing the cross hairs 128 on the measurement grid 140 (or 240), and Z-axis offsets are measured using a caliper telescoping extension or depth gauge through oblong holes 124 as the respective fixable components 111 and 151 of the crack monitor move into or out from the initial crack plane.

Figure 5:
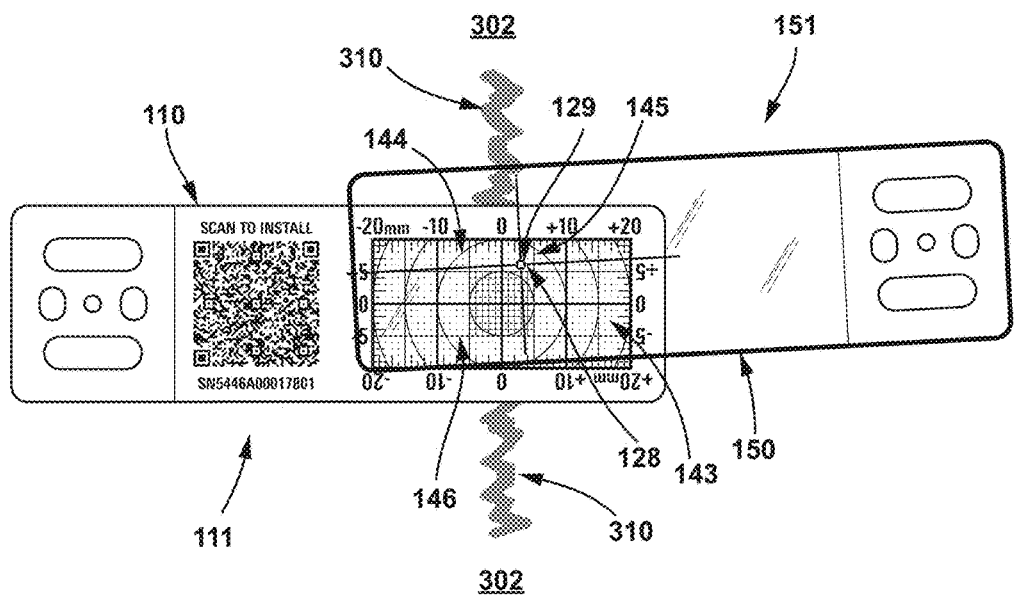
FIG. 5 is a front plan view of the installed crack monitor of FIG. 4 after displacement of portions of the structural member separated by a crack.

FIGS. 4 and 5 illustrate an example of relative movement between fixable components 111 and 151 due to shifting of respective portions of structural member 302 on opposing sides of crack 300. Further shown is how the relative displacement of the portions of structural member 302 can be monitored using the crack monitor. As shown in FIG. 4, the fixable components 111 and 151 are assembled in an initial position on structural member 302 such that upper plate 150 is on an opposite side of crack 300 from lower plate 110 with both plates 110,150 extending over crack 300 and upper plate 150 overlying lower plate 110. Further, the initial position is such that upper plate 150 and lower plate 110 are generally aligned and such that the center 129 of the crosshairs 128 is aligned with the origin of the Cartesian grid X-Y axes.

As shown in FIG. 5, the crack 300 depicted in FIG. 4 has widened to crack 310 as a result of relative displacement between the portions of structural member 302 respectively associated with upper plate 150 and lower plate 110. Such displacement is further reflected in the resulting relative movement between upper plate 150 and lower plate 110. Such movement can be measured by the displacement of crosshairs 128 with respect to the reference grid 140. As shown, center 129 of crosshairs 128 can be a small circle that interrupts the crosshair 128 lines, allowing, for example, a particular one of tick points 143 to be viewed therethrough. By determining the positioning of the tick point 143 associated with center 129 of crosshairs 128, the relative displacement between upper plate 150 and lower plate 110 and, accordingly, the displacement of the portions of structural member 302 in the X-Y plane, can be determined. In various other examples, various ones of the gridlines 145,146, tick marks 141, or circles 144 can be seen through or adjacent to center 129 of crosshairs 128 such that measurements specific to such examples may be obtained. In particular, the Cartesian grid comprised of the X- and Y-axes, as well as the tick marks 141, tick points 143, horizontal gridlines 146 and vertical gridlines 145 can be used to measure the movement in horizontal and vertical components, whereas the circles 144 can be used to measure the absolute planar movement. As discussed above, Z-axis movement can be measured using apertures 124, as shown in FIG. 1.

Figure 6:
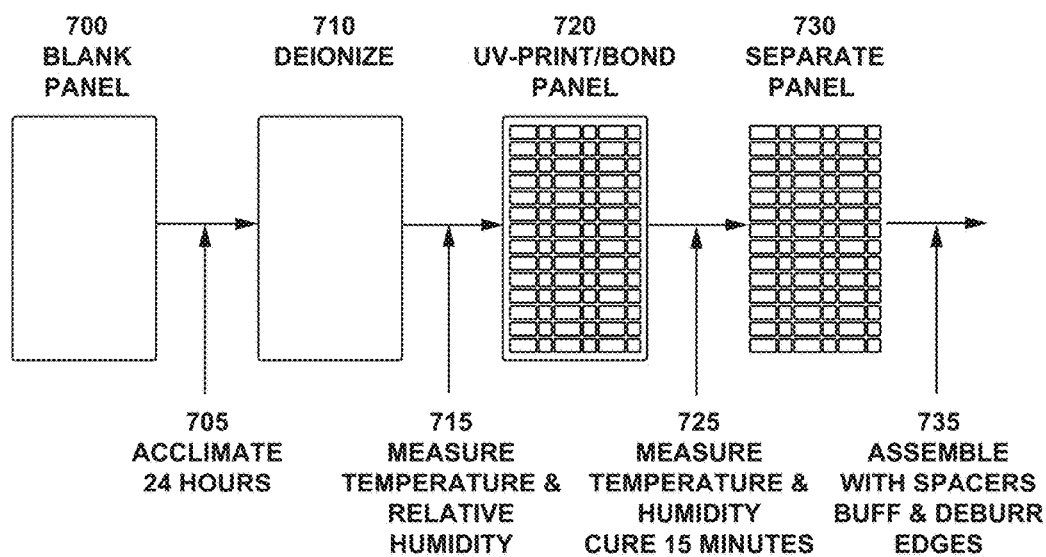
FIG. 6 is a flow chart of a manufacturing process of a crack monitor.

FIG. 6 describes the manufacturing process according to a method of another embodiment of the present disclosure. The crack monitor uses a method of manufacturing that differs from traditional injection-molded processes. Namely, the manufacturing process leverages precision-extruded thermoplastic or plate metals, flatbed digital UV inkjet printing, and digital routing. For ease of shipping, handling, and overall precision, a suitable panel 700 size may be 24"×48", but may be smaller or larger without significant adverse impact to quality or cost per part. In 705, each panel acclimates horizontally at rest to the factory ambient temperature and humidity, ideally in the range of 20-259C and 45%-55% relative humidity for at least 24 hours prior to printing. In the case of thermoplastics, the panel is neutralized immediately prior to printing with ionized air 710 to reduce or eliminate static electricity. Static electricity can cause fanning of digital printing, resulting in suboptimal image clarity.

In 715, the ambient humidity may be measured and recorded, as well as the panel temperature using an IR thermometer, such as a Fluke 62 MAX+ or similar device. It may be advantageous to cut the material at approximately the same temperature and humidity level at which it was printed, and to apply any emissivity corrections to the temperature measurements based on the particular material. For example, acrylic has a typical emissivity of 0.90-0.95. It may be advantageous to compare a test sample with actual surface temperature measurement using a surface thermocouple to assure calibration of the IR thermometer. This step may reduce errors due to thermal expansion between the time the panel was printed and cut. To ensure optimal registration of the overlapping plates and mitigate errors from thermal expansion, all components may be simultaneously printed (step 720) by bonding UV-curable inks thereto. Printing may be conducted at 1000 dots-per-inch (dpi), unidirectional, with heavy smoothing. This may reduce ink spread and may also eliminate alignment issues of the print head associated with bidirectional printing.

The crosshairs 128 on upper plate 150 may be printed in mirror image on an adjacent section of the panel 700 using a deep-red UV-cured ink, in approximate proportions of 15C/100M/90Y/10K, which provides improved durability and fade resistance. When plate 150 is flipped over during installation, the cross hairs 128 are on the bottom surface of plate 150, which may further improve resistance to UV-fading, and may further eliminate or reduce parallax associated with the plate thickness during measurements.

Upon completion of printing 720, the substrate and ink may be allowed to cure for, e.g., at least 15 minutes prior to cutting, including re-measurement of temperature and humidity 725. The additional curing time may allow the UV inks to physically bond to the substrate, which may serve to reduce the risk of chipping or peeling of inks during cutting operation. In 730, the panel may be separated or cut (such as by routing or the like) from the singular substrate 700. Printing and cutting advantageously occurs in a stable temperature-and-humidity-controlled environment to avoid tolerance stacking from thermal expansion and contraction of the panel substrate. Components are digitally routed using a 2 mm or comparably-sized spiral router bit to accommodate a wide range of custom sizes as defined by the original artwork, including measurement grid variations, and fastener types. Due to the flexibility of the process, a single substrate may contain multiple sizes of crack monitors with measurement ranges from less than 10 centimeters to as large as 1 meter or more.

Upon completion of routing, components may be snapped from the panel 700 and may be kept in pairs for best alignment. In 735, a spacer 170 of at least the same thickness of the panel 700 is chemically bonded to the rear side of plate 150 using a thermoplastic adhesive appropriate for the material, such as Weld-On or similar. This spacer may allow the two plates 110 and 150 to freely move relative to one another, as discussed above with respect to FIGS. 3-5. Alternatively, the spacer 170 may be thicker or thinner than plate 150 and left uninstalled, allowing the customer to adjust the spacer thickness at the job site based on the unique conditions of the crack under measurement. Spacers may be available in a range of thicknesses, such as from about 0.5 mm to at least about 18 mm, which may be in 0.5 mm increments.

Alternatively, a stepped, interlocking spacer and integrated stair pattern on the back-side of opposing crack monitor plates may accommodate minor variations in Z-axis crack planes in small increments, typically in the range of a 0.5 mm step size using only a single spacer.

Figure 7A:
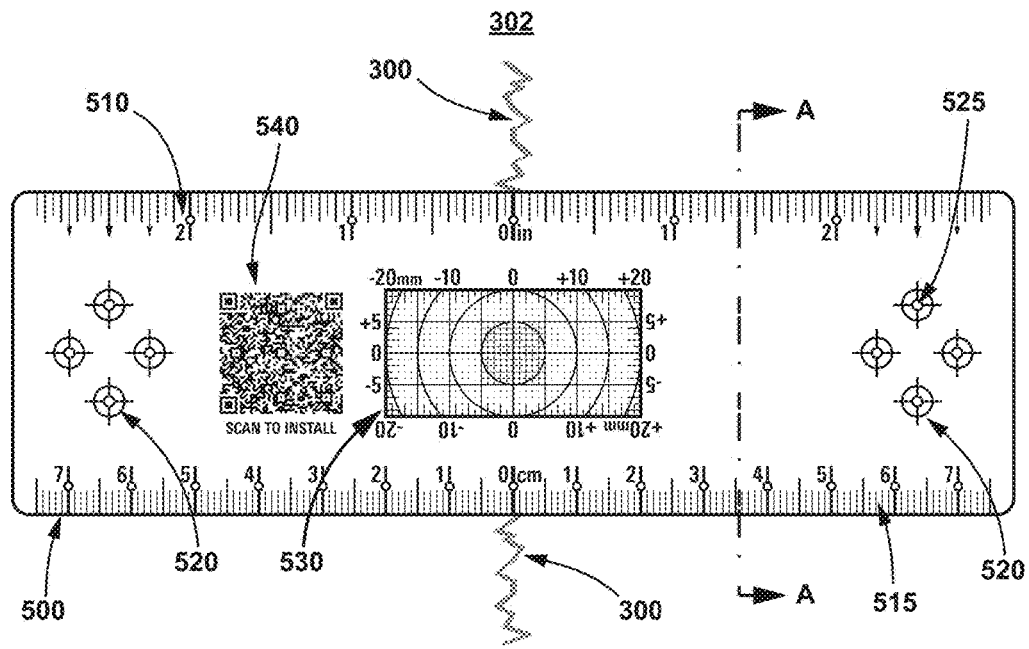
FIGS. 7A and 7B are front elevation and side cross-sectional views of a drilling guide that is useable in one application thereof in installing the crack monitors of FIG. 1 or FIG. 2.
Figure 7B:
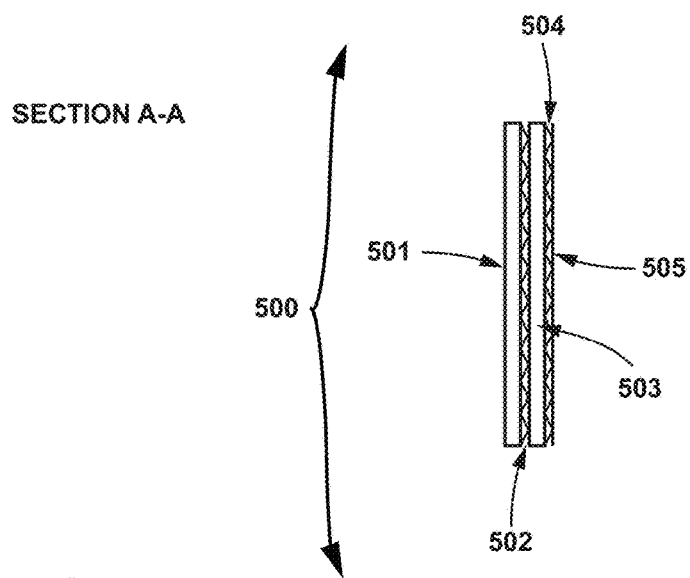
Figure 8A:
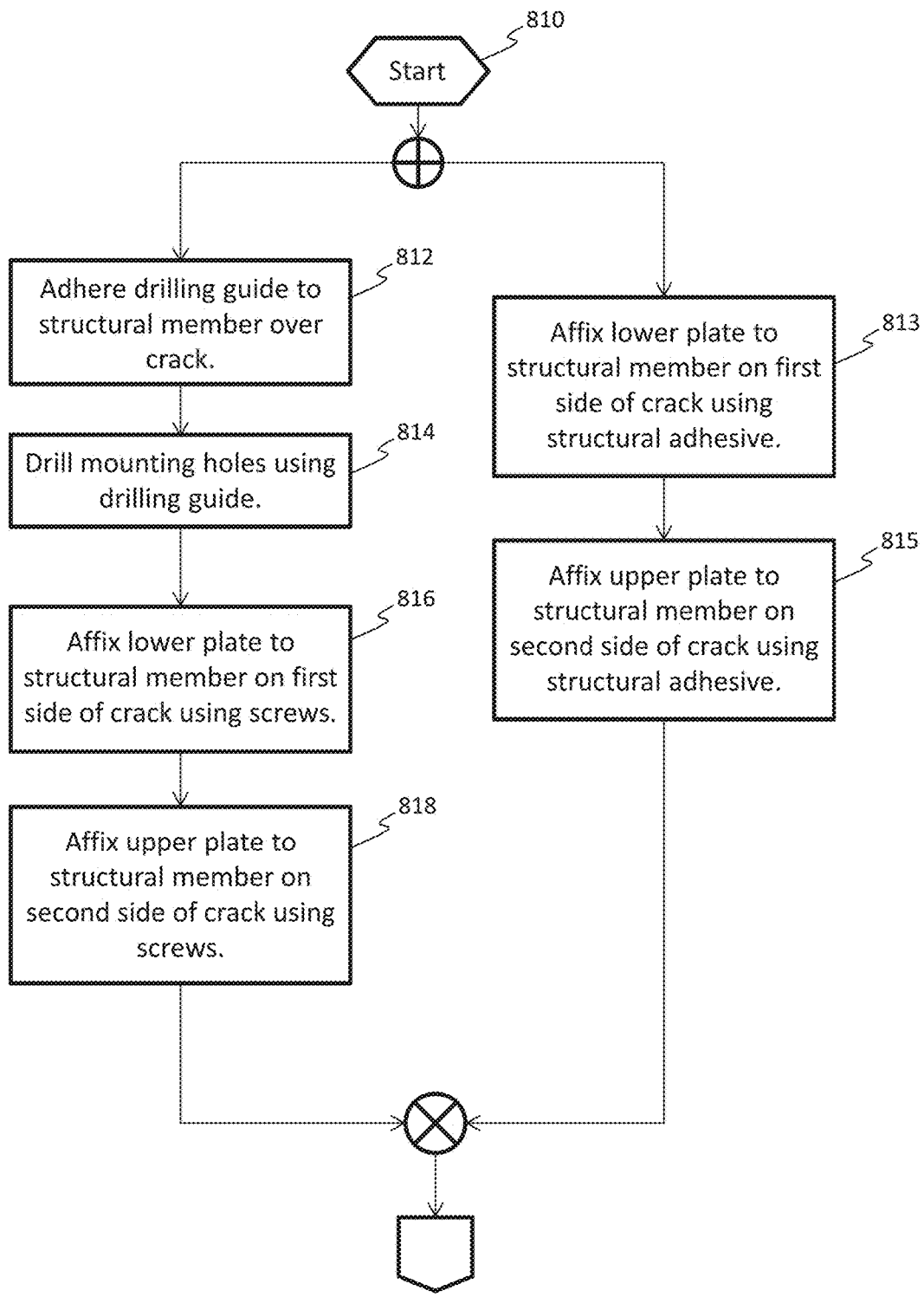
FIGS. 8A-8C are a flowchart illustrating various steps in installing a crack monitor according to FIG. 1 or FIG. 2 and using the installed crack monitor to measure displacement between two portions of a structural member separated by a crack.
Figure 8B:
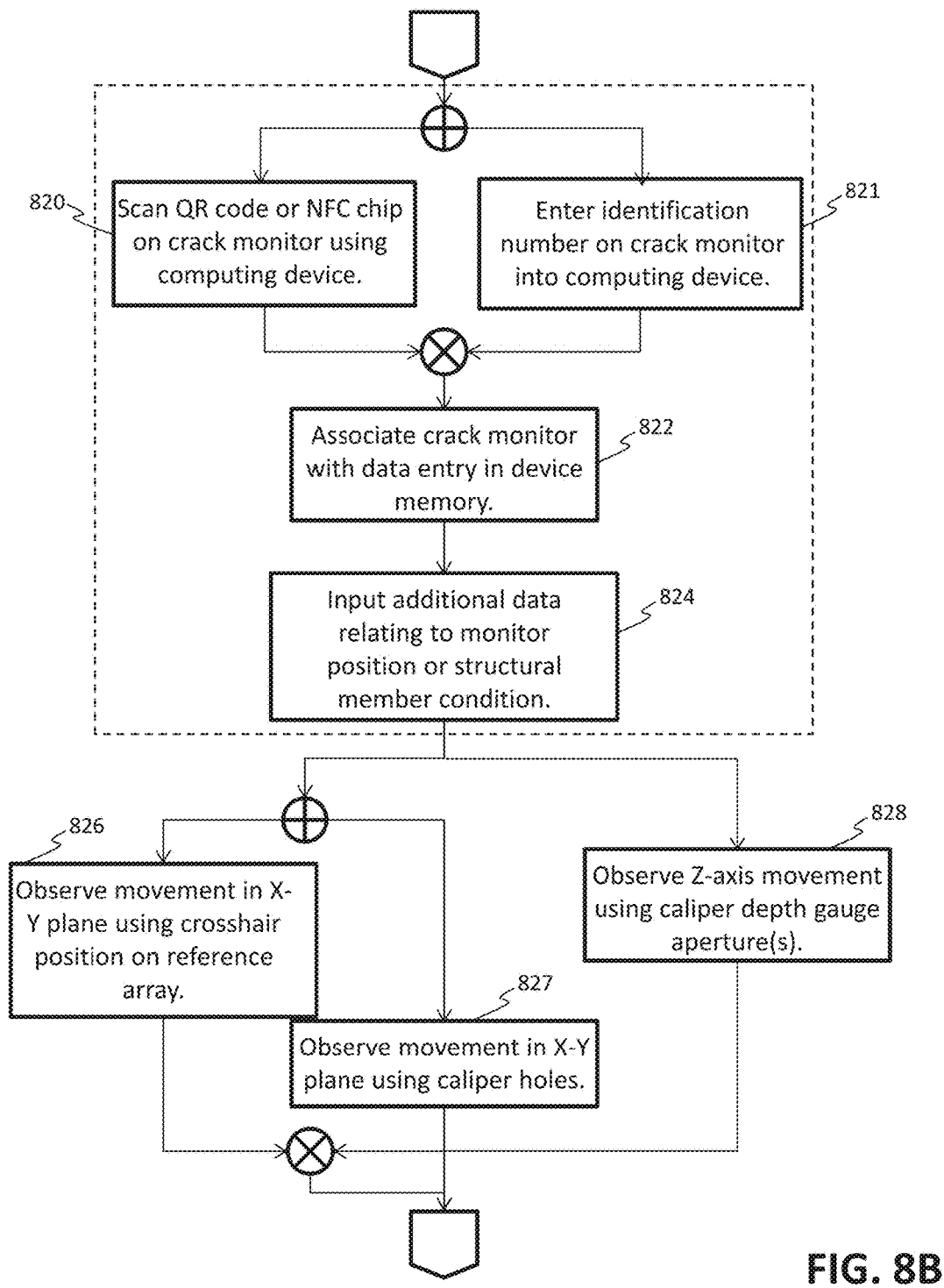
Figure 8C:
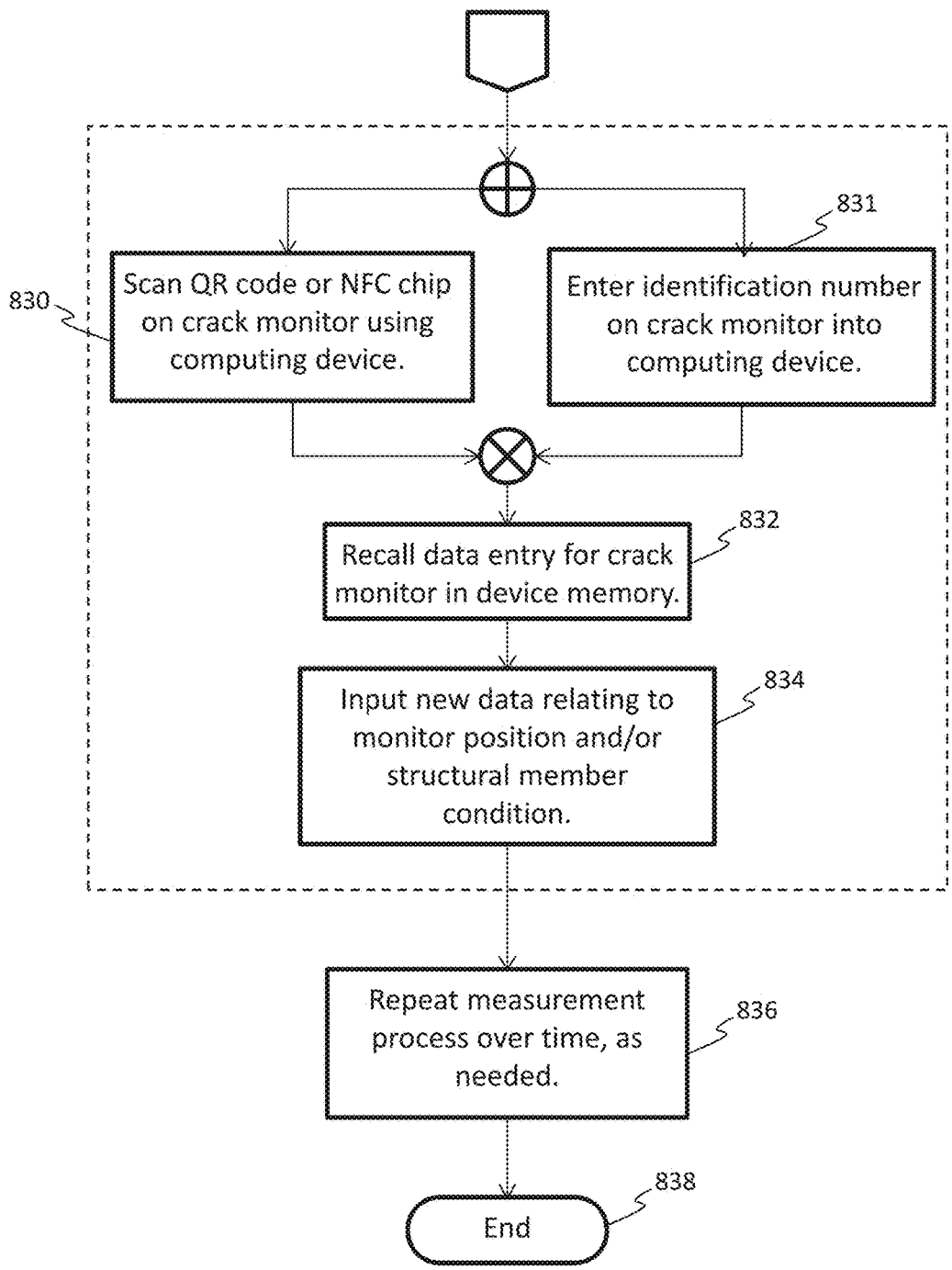

The flowchart spread among FIGS. 8A-8C illustrate a method for using a crack monitor, as shown in either FIG. 1 or FIG. 2 and fabricated according to the above-described process according to FIG. 6. After starting the process in step 810, the crack monitor can be installed using mechanical fasteners, such as the various screws described above. In such an installation, a drilling guide can be used to create holes in the structural member 302. As shown in FIGS. 7A and 7B, the drilling guide 500 can be of a layered structure including an upper layer 501 of rigid, or semi-rigid, expanded PVC, such as SINTRA® (A3 Composites) or foam-core board, which may be at least 2 mm to 3 mm thick. The drilling guide 500 may also include shock-absorbing foam backing 503, which in an embodiment may be configured as a peel-off backing, between 0.5 mm to 3 mm thick and, in an embodiment between 1 mm to 2 mm thick, and which may be adhered to the upper layer 501 using a first adhesive layer 502. Further, an aggressive rubber or acrylic adhesive layer 504 can cover a surface of the foam backing 503 opposite the upper substrate 501. The adhesive in layer 504 can be of a type and aggressiveness that remains secure during hammer-drilling operations and that can be cleanly removed after the associated mounting holes are drilled. A peel-off backing layer 505 can be removably applied over adhesive layer 504 to prevent unintended adhesion thereto prior to use during the installation process.

The use of a foam backing 503 can allow the drilling guide 500 to be adhered to an uneven surface of the structural member 302, including over crack 300, which may already exhibit a Z-axis offset. In particular, the multi-layer construction may improve hole alignment when hammer-drilling into hard or uneven/rough surfaces, such as concrete or stippled surfaces like stucco. The upper layer 501 provides a semi-rigid surface to ensure dimensional stability across a crack and secure the drill bit into position. Once installed, as the drill bit goes through the drilling guide 500, due to the overall thickness of the template, it creates a self-guiding hole that "locks" the drill into position, providing generally consistent hole alignment.

The drilling, guide 500, as shown can include a plurality of drill targets 520 that generally correspond to the various holes 121, 122 in upper plate 150 and lower plate 110, with the drill targets 520 corresponding to more specific locations such that the elongated nature of the holes 121, 122 in plates 110,150 can be used to adjust the particular positions thereof and to account for any variations in the positioning of the holes drilled using targets 520 in step 814. Drilling guide 500 may also include a center point 525 within a central portion of targets 520. The center point 525 may be recessed or deposed within upper layer 501 or may also be simply printed markings. Further drilling guide 500 may also include a printed grid 530 similar to the measurement array 140 of the crack monitor to give a general sense of the final positioning to be provided by the drilling guide 500. Further, the drilling guide 500 may include printed rulers, in English 510 and metric 515 scales, for further reference and utility. A QR-code 540 may also be printed on upper layer 501 for quick access to installation documents or instructional videos, for example, using a smartphone, tablet, or the like.

Such a drilling guide 500 may have applications beyond the method described herein, including drilling mounting holes in essentially any type of structural or other drillable member for mounting essentially any mountable object, as such a drilling guide 500 can keep the associated drill in generally the desired position and can reduce or prevent "chattering" of the drill. In such other applications, the thickness of foam backing 503 and the aggressiveness of the adhesive layer 504 can be adjusted for, for example, flatter surfaces with less variation, more delicate and/or surfaces that more easily accept adhesion (e.g. metal and the like). Further, the graphics printed on the upper substrate 501 can also be printed in ways specific to additional applications including, for example, specific instructions, rulers, etc. The drilling guide 500 used in the present method can also be made of varying sizes to correspond with varying sizes of the drilling guide, desired mounting hole pattern. In the present example, the size of drilling guide 500 can be determined by the size of plates 110, 150 and spacers 170 or can include holes corresponding with multiple sizes of drilling guides with printed indicators giving notification of the particular size intended for use with such holes (e.g. in varying colors, etc.).

In an example, four 3/16" (5 mm) mounting holes can be drilled at least 1½" deep into the target mounting surface of structural member 302, and the holes can be cleaned of dust and debris. In steps 816 and 818, the respective fixable components 111 and 151 comprising, respectively, lower plate 110 and upper plate 150 can be affixed with the structural member 302 using screws. In particular, Toggler®-brand Alligator® A5 polypropylene anchors, compatible with a wide range of fastener sizes, including #6(M3.5), #8(M4.0) or #10(M5.0) can be used. In a further example, wherein four (4) stainless-steel sheet metal security fasteners typically #6/M35 or #8/M4 Torx® or TorxPlus® approximately 1½" in length can be inserted and hand-tightened with stainless-steel lock washers and stainless-steel load-distributing plates to secure the respective fixable components 111 and 151 of crack monitor against vandalism and inadvertent movement, while simultaneously reducing the likelihood of cracking the thermoplastic substrate. The Torx® or Torx Plus® security screws can be substituted with Key-Rex® or Penta Plus® security fasteners from Bryce Fastener, which offer a secure screw head with a proprietary custom key. Further, one or more spacers 170 can be assembled and fixed to structural member 302 along with plates 110 and 150 in the respective fixable components.

Alternatively, adhesive, such as epoxy or the like can be used to adhere lower plate 110 (step 813) and upper plate 150 (step 815) to structural member 302, as discussed above. Structural thixotropic epoxy, such as Buildera StruPoxy™, Aboweld™ 8101-5, or similar adhesive can be used. In a further variation, both mechanical fasteners and adhesive can be used.

Continuing in FIG. 8B, once the fixable components 111 and 151 of the crack monitor are affixed with the structural member 302, the particular crack monitor can be associated with a data entry in the memory of a portable computing device (such as a smartphone, laptop computer, or the like) or cloud-based memory otherwise accessible to such a device. In particular, a smartphone or the like can be used to scan QR code 125 or, alternatively, an NFC chip embedded or adhered to plate 110 (step 820). Alternatively, in step 121, an identification number can be manually entered into the application. An application running on the device can then associate a particular data entry field with the particular crack monitor and can allow the crack monitor to be associated with relevant data (step 822). Additional data, such as the fixation method, plate 110, 150 size, initial date, initial crack size (measured, e.g., with calipers), material, etc. can be entered in the data field and, thus, associated with the particular crack monitor (step 824). In a further aspect, GPS data can be pulled from the device itself and automatically entered into the associated data entry field.

In an embodiment, the QR code 125 and/or unique ID 126 can be incorporated to provide a means to scan the device using a camera-equipped mobile smart phone or tablet computer to point to online installation information, including but not limited to data sheets, installation guides, video tutorials, reordering information, and the like. ID 126 uniquely identifies the crack monitoring device and can associate its location with GPS data from the phone, or manually entered by the user. This ID can include a human readable serial number and may also be digitally coded into QR code 125. Embedded tracking code in 125 may facilitate subsequent click-stream analysis using Google® Analytics™ and similar services. An NFC microchip (Near Field Communications) may be substituted in label form, or used in conjunction with the QR Code to relay crack environment data back to a host website via a mobile phone.

As further, described above, after installation and collection of initial information, crack monitor can be periodically checked to observe any movement of structural member 302 associated with crack 300. In particular, movement in the X-Y plane can be measured using the position of crosshairs 128 with respect to the measurement array 140 (step 826) and/or with calipers in connection with center holes 123 (step 827). Further, any Z-axis offset can be measured using a caliper depth gauge in connection with apertures 124 (step 828). As shown in FIG. 8C, such measurement information can also be entered into the data entry field associated with the crack monitor by subsequent scanning of the QR code 125 (or NFC chip) with the device (step 830. Alternatively, an identification number on plate 110, for example, can be entered (step 831). Either such step can recall the previous data entry for the particular crack monitor from memory (step 832). Accordingly, updated data, including the measurements obtained in steps 826, 827, and 828 can be entered into the field. In this manner, a single device can be used to obtain time-based measurements of a number of crack monitors (which can be associated with one another according to various groups thereof). In a further variation, specialized software can use an image obtained by the device of the crosshairs 128 overlaid with the measurement array 140 to calculate any offset, such a measurement being automatically stored in the pertinent field. Such measurements and data storage can be repeated over time in step 836, which can be done at regular intervals, for example, for monitoring or data analysis purposes before ending such monitoring (step 838), such as by removal of the crack monitor or the like.

It will be understood by one having ordinary skill in the art that construction of the described invention and other components is not limited to any specific material. Other exemplary embodiments of the invention disclosed herein may be formed from a wide variety of materials, unless described otherwise herein.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations. It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A system for monitoring a crack in a structural member, comprising:
    a first fixable component including a first plate defining a top surface and a bottom surface, the first plate being at least partially transparent in at least a first area thereof, and the first fixable component further including a mounting surface disposed away from the bottom surface of the plate; and
    a second fixable component including a second plate defining a top surface and a bottom surface defining a mounting area thereon;
    wherein:
        a distance between the mounting surface and the bottom surface of the first plate is greater than a thickness of the second plate defined between the top and bottom surfaces thereof;
        a measurement array is disposed on one of the first plate within the at least partially transparent area and the second plate, the measurement array including a Cartesian grid defining a center and a plurality of concentric circles emanating from the center; and
        a pair of orthogonal crosshairs is disposed on the other of the first plate within the at least partially transparent area and the second plate.

2. The system of claim 1, wherein the Cartesian grid is defined by an array of tick points corresponding to regular X-axis and Y-axis intervals.

3. The system of claim 2, wherein the tick points are circular and have a diameter of between 0.1 mm and 0.2 mm and the X-axis and Y-axis intervals are both 1 mm.

4. The system of claim 2, wherein Cartesian grid further includes horizontal and vertical gridlines overlying the tick points and spaced apart at multiples of the X-axis and Y-axis intervals.

5. The system of claim 4, wherein the tick points and the horizontal and vertical gridlines are of contrasting colors.

6. The system of claim 5, wherein the horizontal and vertical gridlines are further of a first color at a first multiple of the X-axis and Y-axis intervals and are of a second color at a second multiple of the X-axis and Y-axis intervals.

7. The system of claim 2, wherein the pair of orthogonal crosshairs define an intersection, a circle being disposed at the intersection and interrupting the pair of orthogonal crosshairs within an interior thereof.

8. The system of claim 7, wherein the pair of orthogonal crosshairs is of a first color and the Cartesian grid is of at least a second color.

9. The system of claim 1, wherein:
    the first fixable component is affixable to a structural member on a first side of a crack therein with the first plate extending over the crack; and
    the second fixable component is affixable to the structural member on a second side of the crack with the second plate overlapping the first plate such that the pair of crosshairs is alignable in a zero position with respect to the reference grid.

10. The system of claim 9, wherein the first plate further defines at least one caliper depth gauge aperture in an area thereof positionable over the second plate.

11. The system of claim 1, further including a plurality of spacers, wherein a stack of at least one spacer is positionable as a part of the first fixable component with a closest of the at least one spacer to the first plate being in contact with the second surface of the first plate and a lower surface of a farthest of the at least one spacer from the first plate defining the mounting surface of the first fixable component.

12. The system of claim 1, wherein:
    the second plate defines a generally rectangular opening therein and further includes an insert removably assembled within the opening; and the measurement array is disposed on the insert of the second plate.

13. The system of claim 1, wherein:
the Cartesian grid defines an X-axis extending from the center of the Cartesian grid;
a first one of the pair of orthogonal crosshairs is an X-axis crosshair; and
the first and second plates define caliper anchor apertures extending from the respective top surfaces and at least partially therethrough, the caliper anchor of the first plate being aligned with the X-axis of the Cartesian grid, and the caliper anchor aperture of the second plate being aligned with the X-axis crosshair.

14. A method for monitoring a crack in a first structural member, comprising:
affixing a drilling guide including a plurality of targets in a first mounting pattern over a crack in the structural member, the drilling guide including a printed substrate with a compressible membrane adhered thereto, a layer of adhesive applied over a surface of the compressible membrane opposite the substrate, the drilling guide being adhered to the structural member by compression of the compressible layer against a surface of the structural member with the adhesive layer in contact therewith;
drilling a plurality of mounting holes into the structural member using the targets according to the first mounting pattern;
mounting a first fixable component to the structural member on a first side of the crack using a first plurality of fixation elements within a first portion of the first mounting pattern, a first plate of the first fixable component extending over the crack;
mounting a second fixable component to the structural member on a second side of the crack using a second plurality of fixation elements within a second portion of the first mounting pattern, a second plate of the second fixable component extending over the crack and overlapping the first plate; and
observing relative movement between the first plate and the second plate over time.

15. The method of claim 14, wherein:
a measurement array is disposed on the first plate, the measurement array including a Cartesian grid defining a center and a plurality of concentric circles emanating from the center;
a pair of orthogonal crosshairs is disposed on second plate within an at least partially transparent area thereof; and
observing relative movement between the first plate and the second plate includes observing a position of the crosshairs with respect to at least one of the Cartesian grid to measure X-axis and Y-axis movement separately and the concentric circles to measure combined X-axis and Y-axis movement.

16. The method of claim 14, wherein observing relative movement between the first plate and the second plate includes measuring a movement component relating to the second plate moving toward or away from the first plate using a caliper depth gauge aperture in the second.

17. The method of claim 14, further including:
identifying the assembled first component and second component using one of an identification number, a QR-code, and an NFC-chip on one of the first component and the second component; and
associating data related to conditions associated with at least one of the structural member or the assembled first component and second component with the identified first component and second component in memory included in a computing device.

18. A system for monitoring a crack in a structural member, comprising:
a first fixable component including a first plate defining a top surface, a bottom surface, and a mounting surface disposed away from the bottom surface of the plate, the first plate having a first plurality of mounting holes therethrough to the mounting surface and a first displacement marking thereon;
a second fixable component including a second plate defining a top surface and a bottom surface defining a mounting area thereon, the first plate having a second plurality of mounting holes therethrough within the mounting area and a second displacement marking thereon; and
a drilling guide including:
a printed substrate with a plurality of first targets in a first mounting pattern corresponding with the first plurality of mounting holes and plurality of second targets in a second mounting pattern corresponding with the second plurality of mounting holes, the first and second mounting patterns being mutually aligned to correspond with an aligned position between the first and second displacement markings;
a compressible membrane adhered to the printed substrate; and
a layer of adhesive applied over a surface of the compressible membrane opposite the substrate.

19. The system of claim 18, wherein the printed substrate further includes an alignment grid in a position corresponding with locations of the first and second displacement markings in the aligned position.

* * * * *